No. 668,339. Patented Feb. 19, 1901.
G. H. PIERCE.
MATTRESS TUFTING MACHINE.
(Application filed Dec. 22, 1899.)
(No Model.) 14 Sheets—Sheet 5.
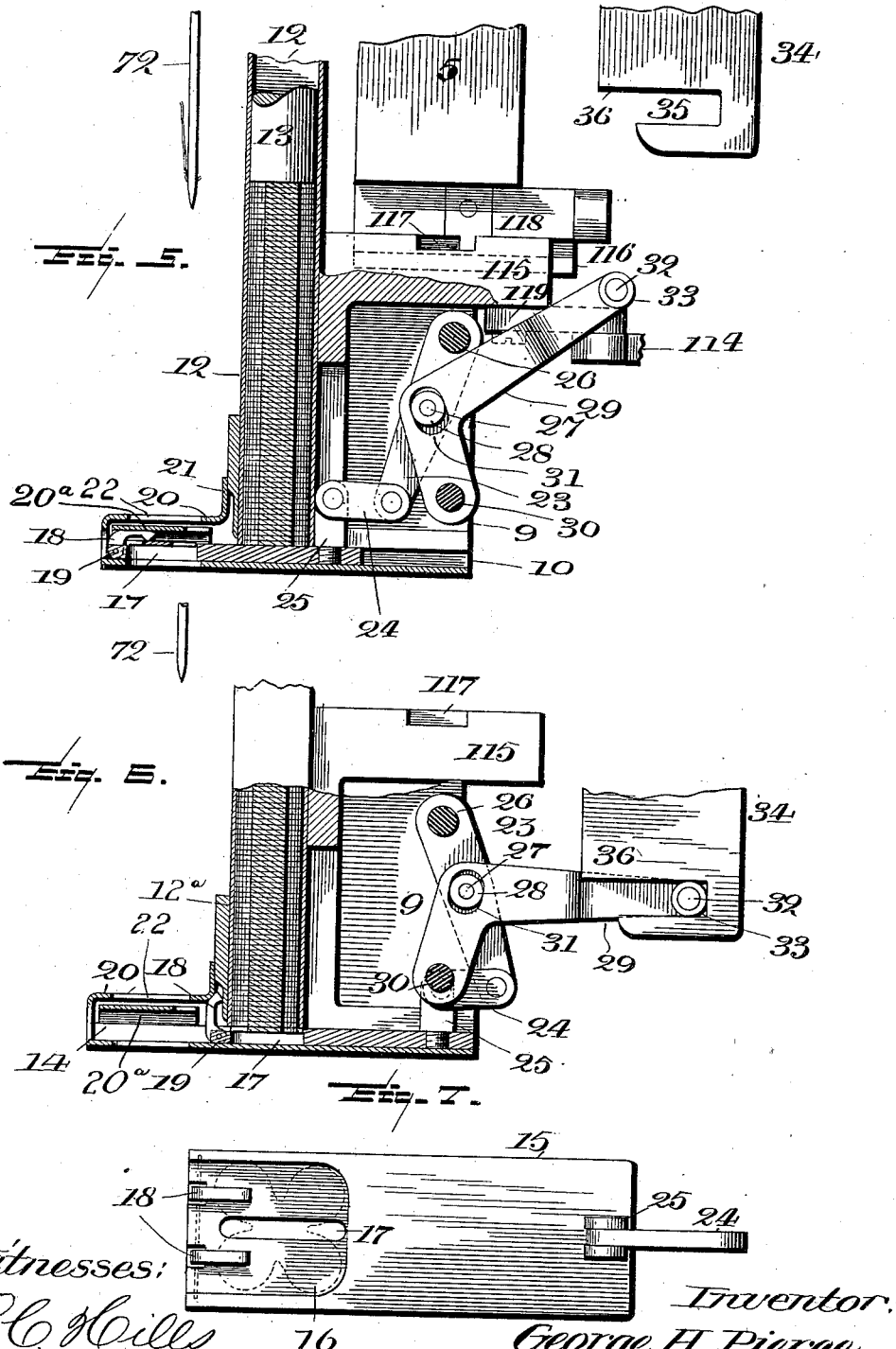

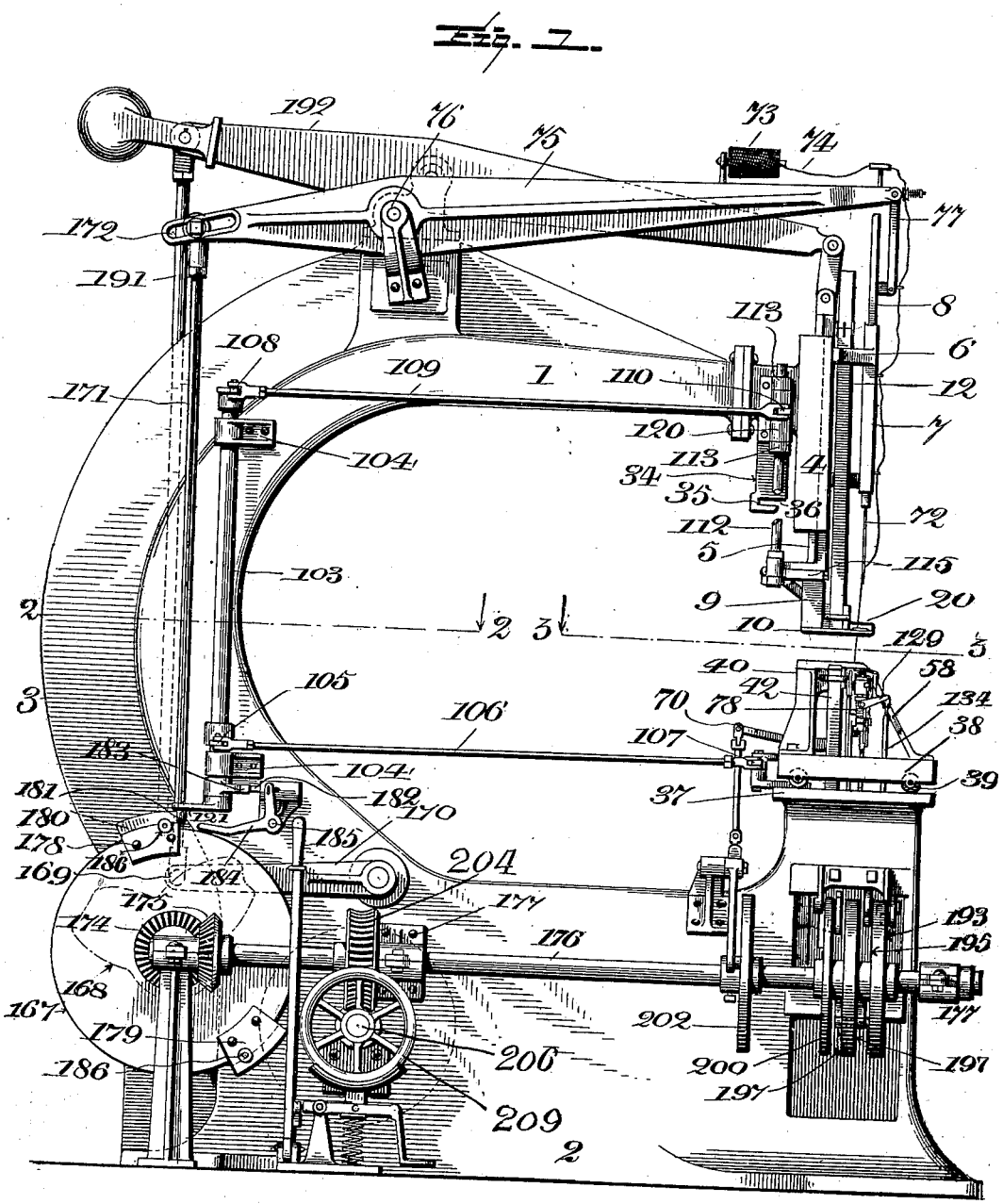

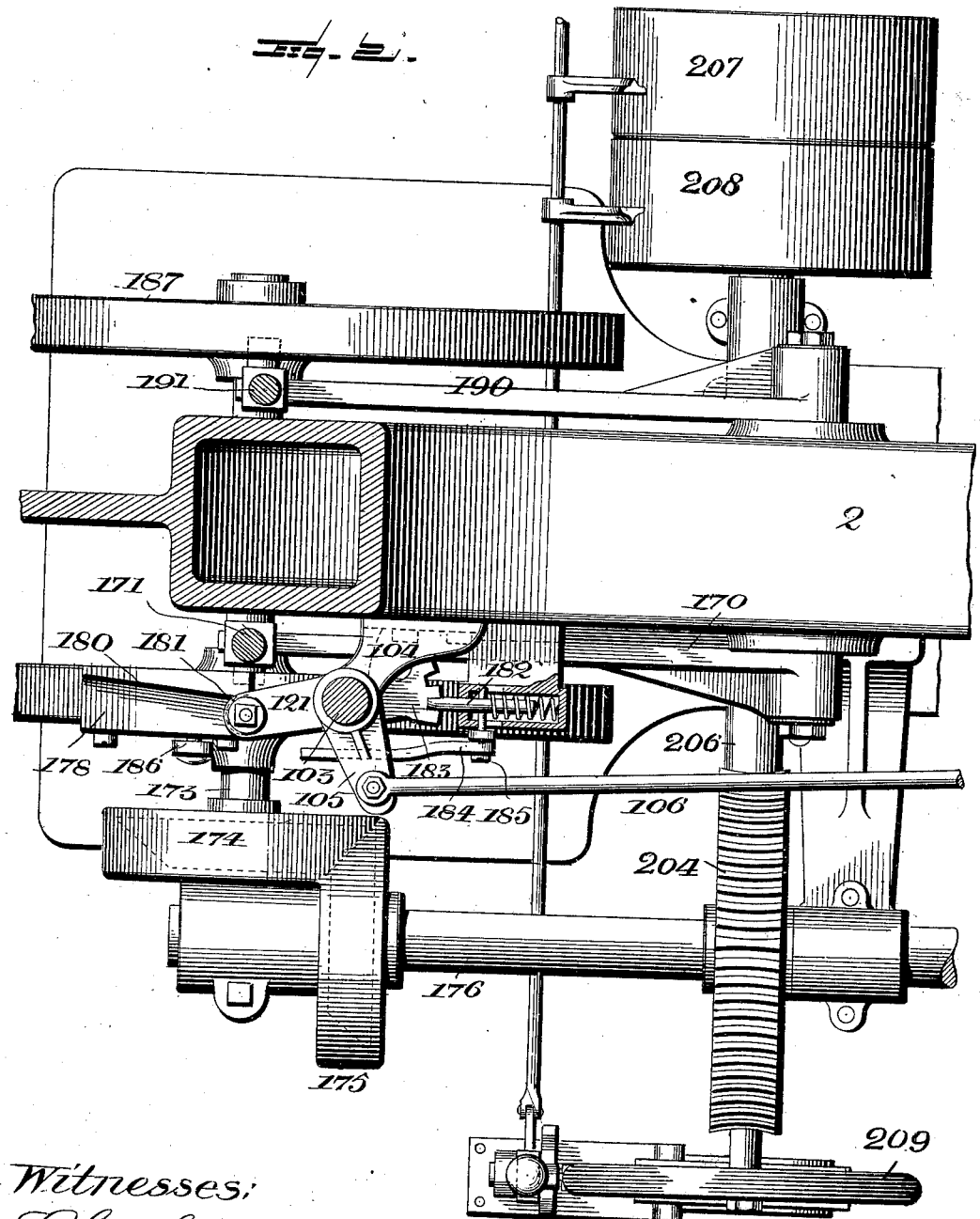

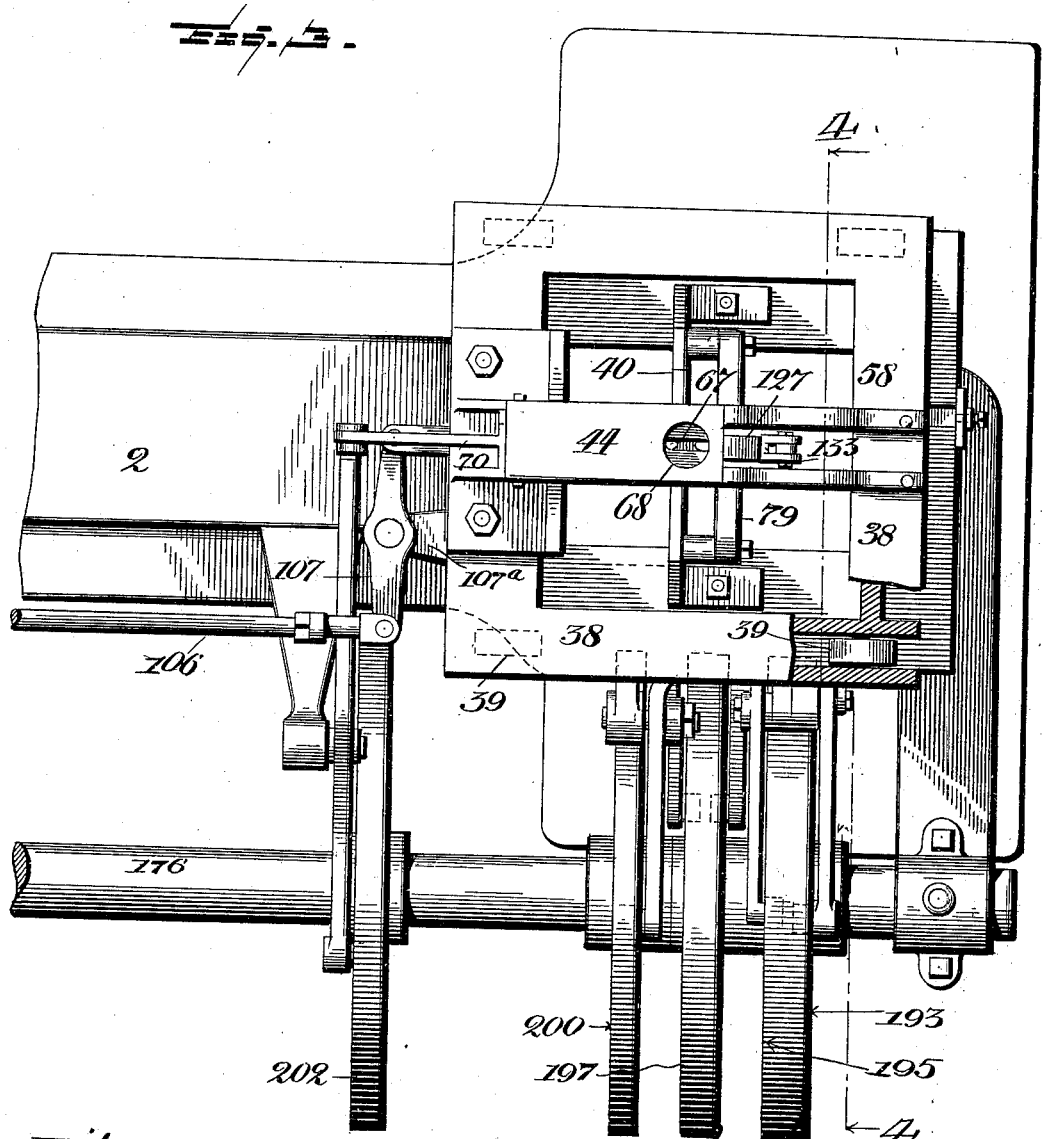

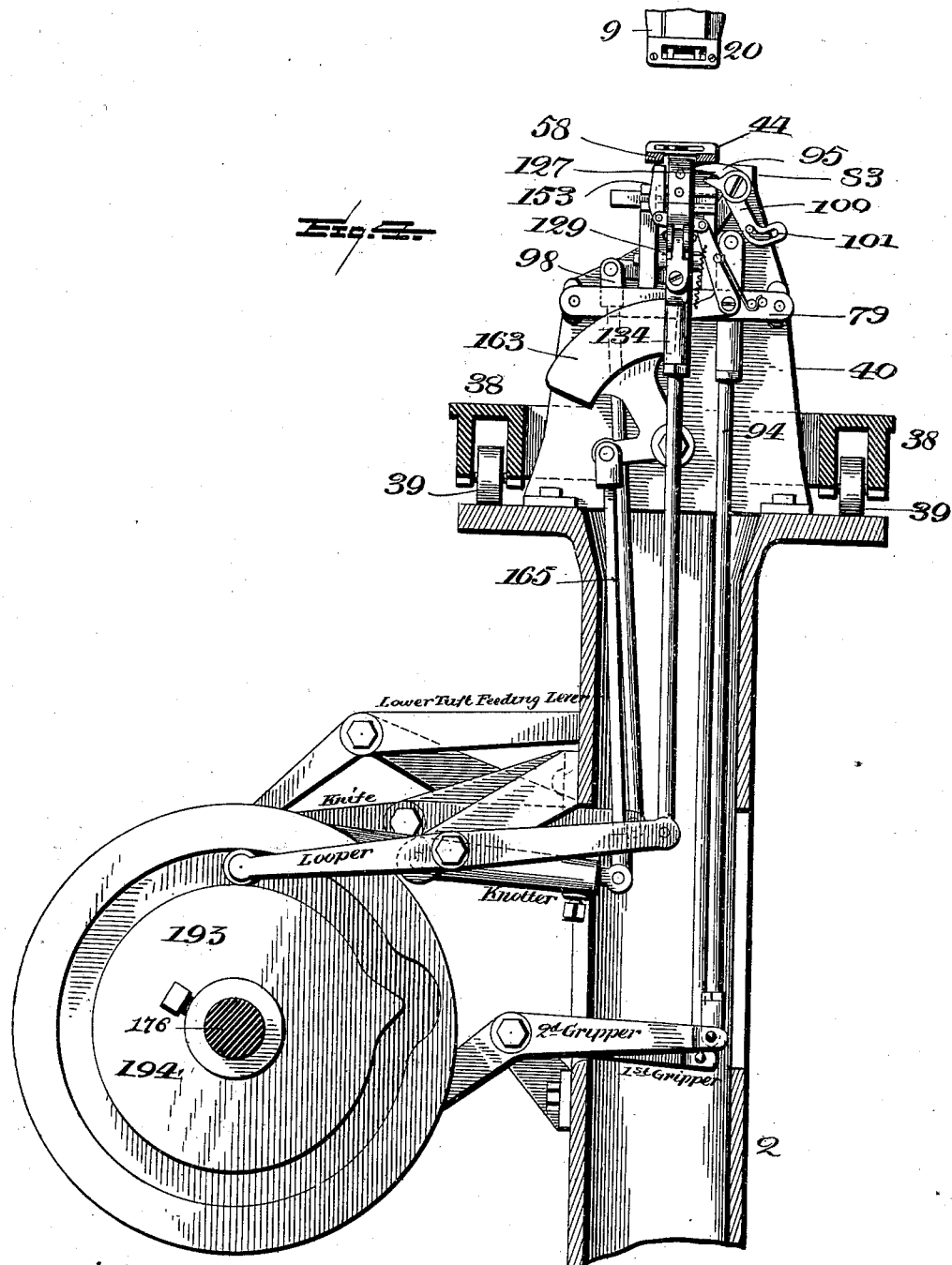

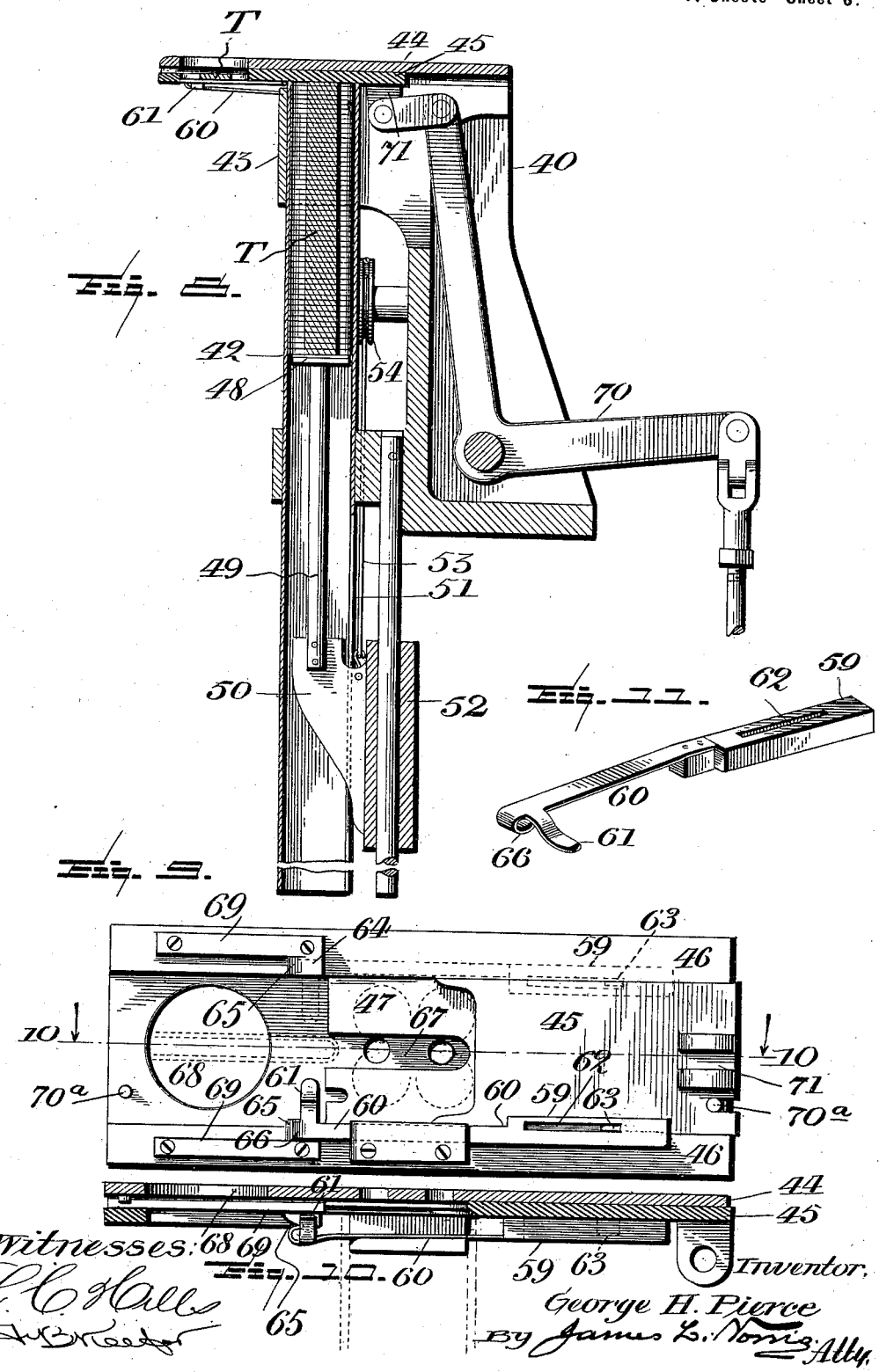

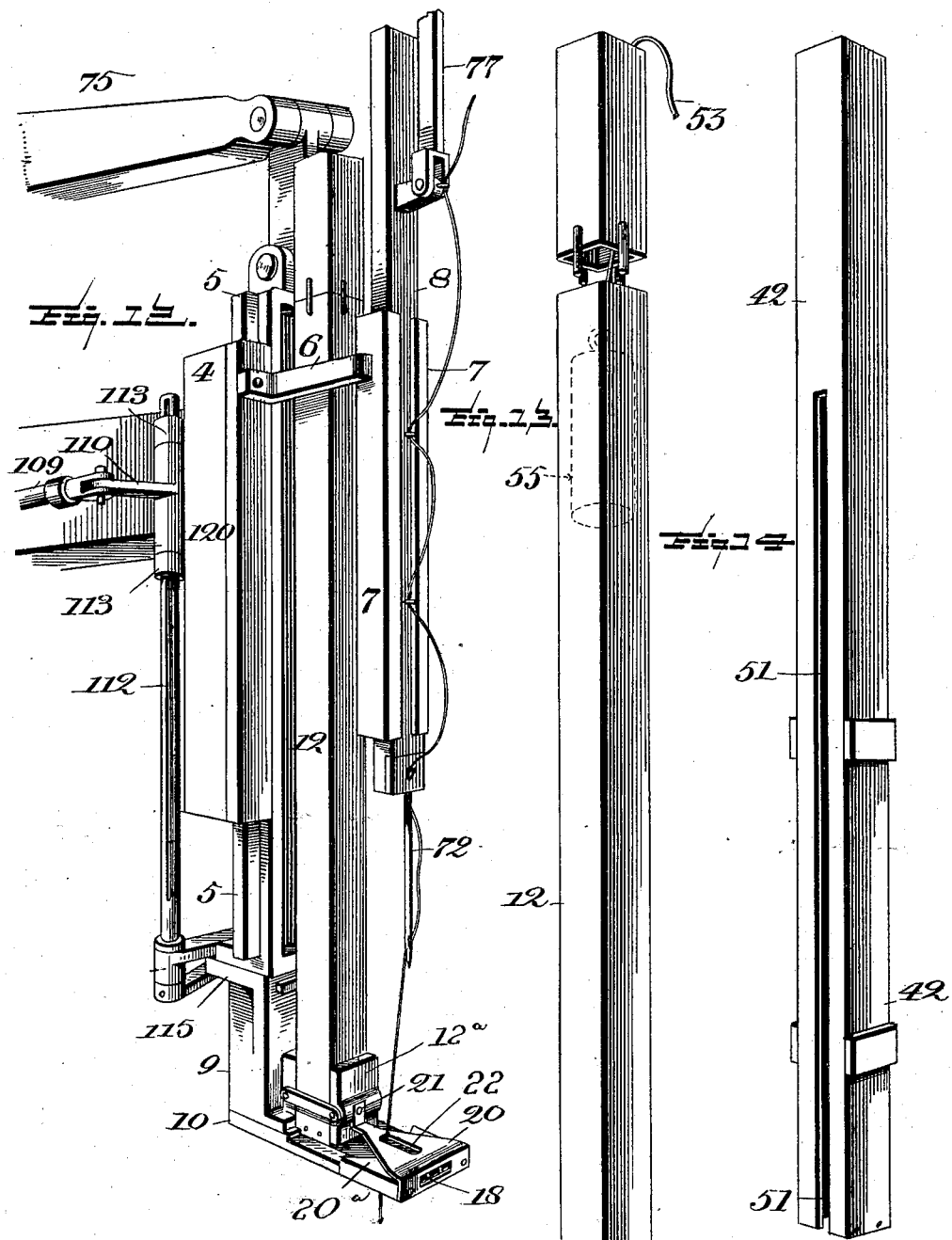

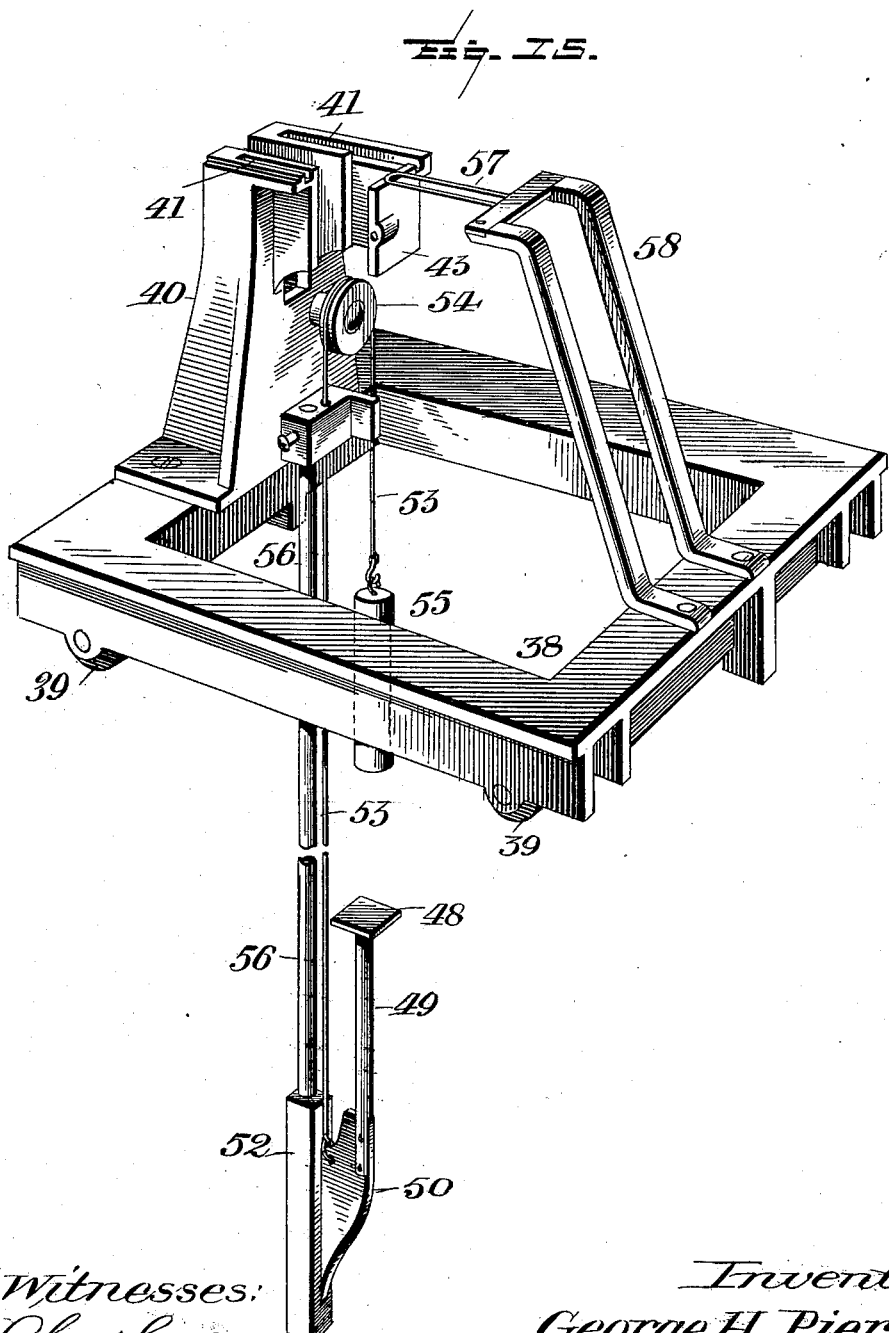

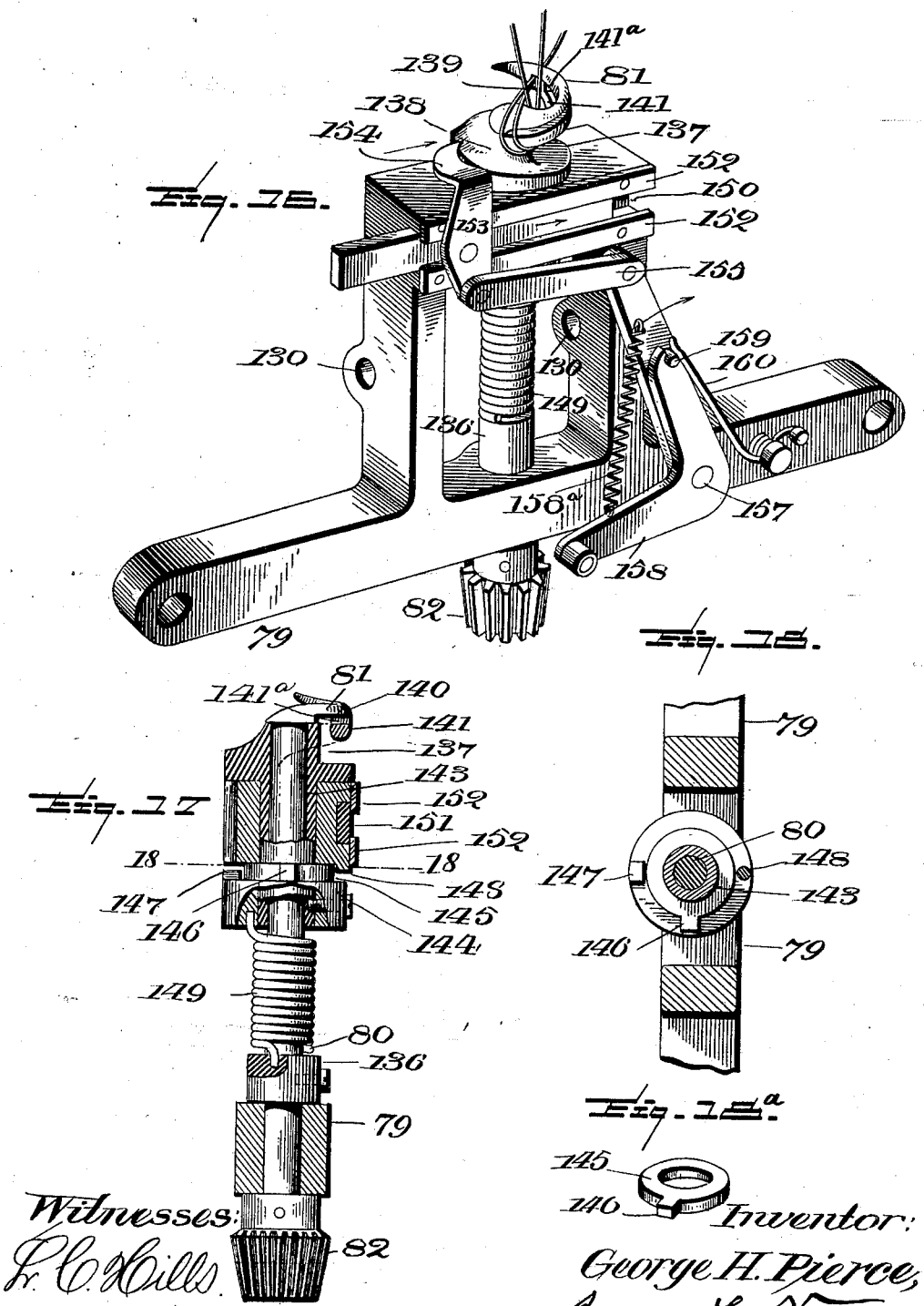

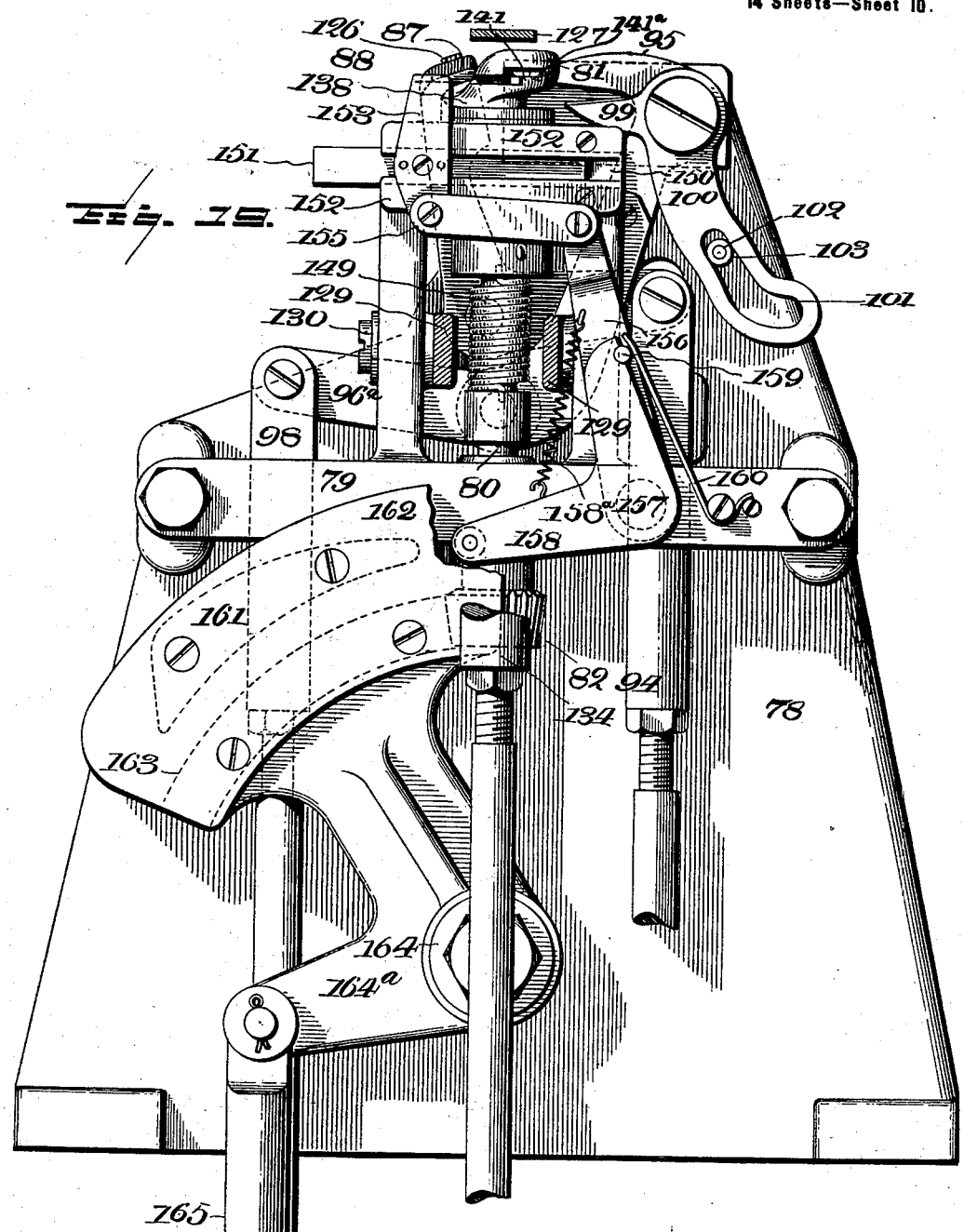

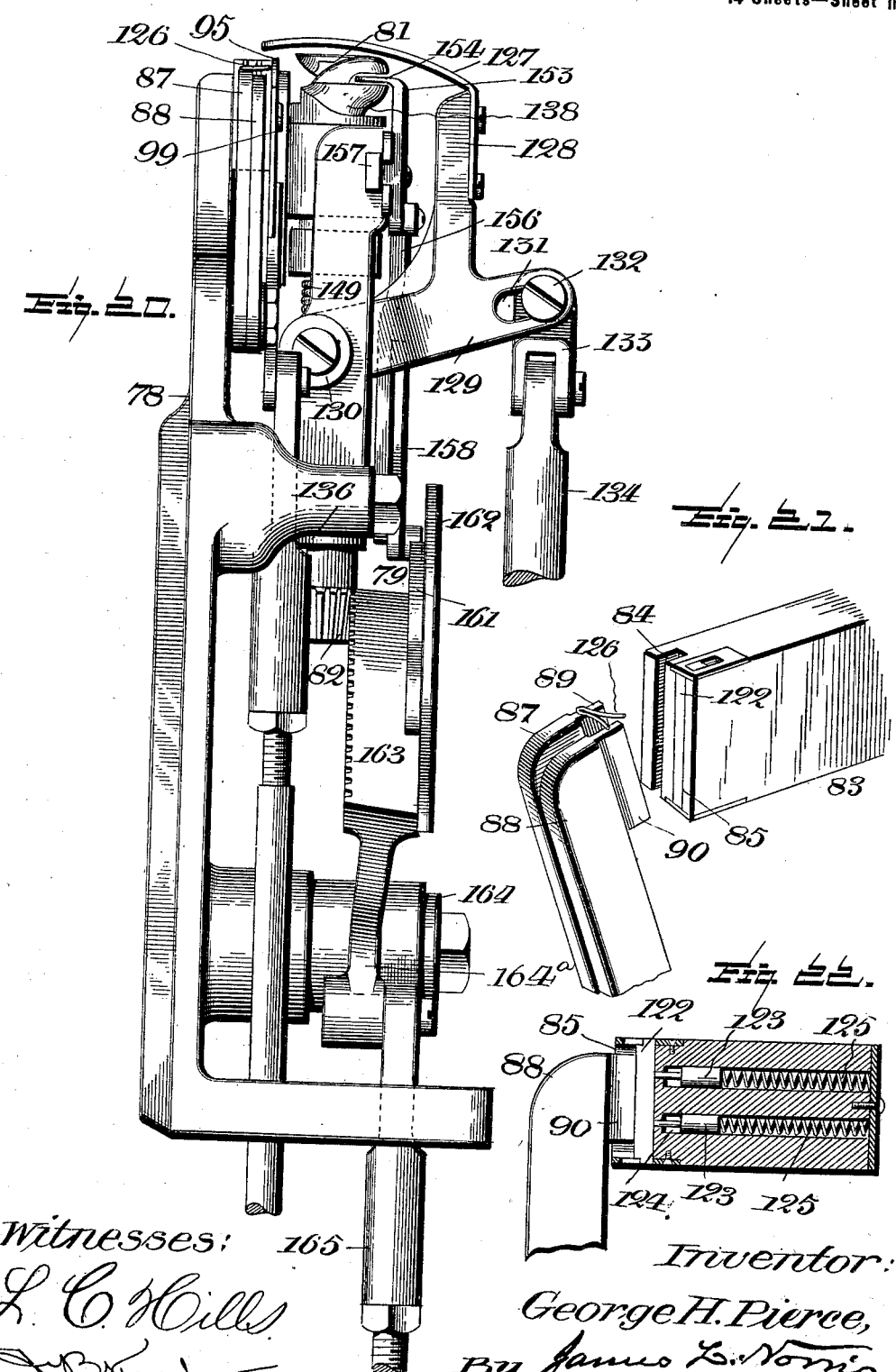

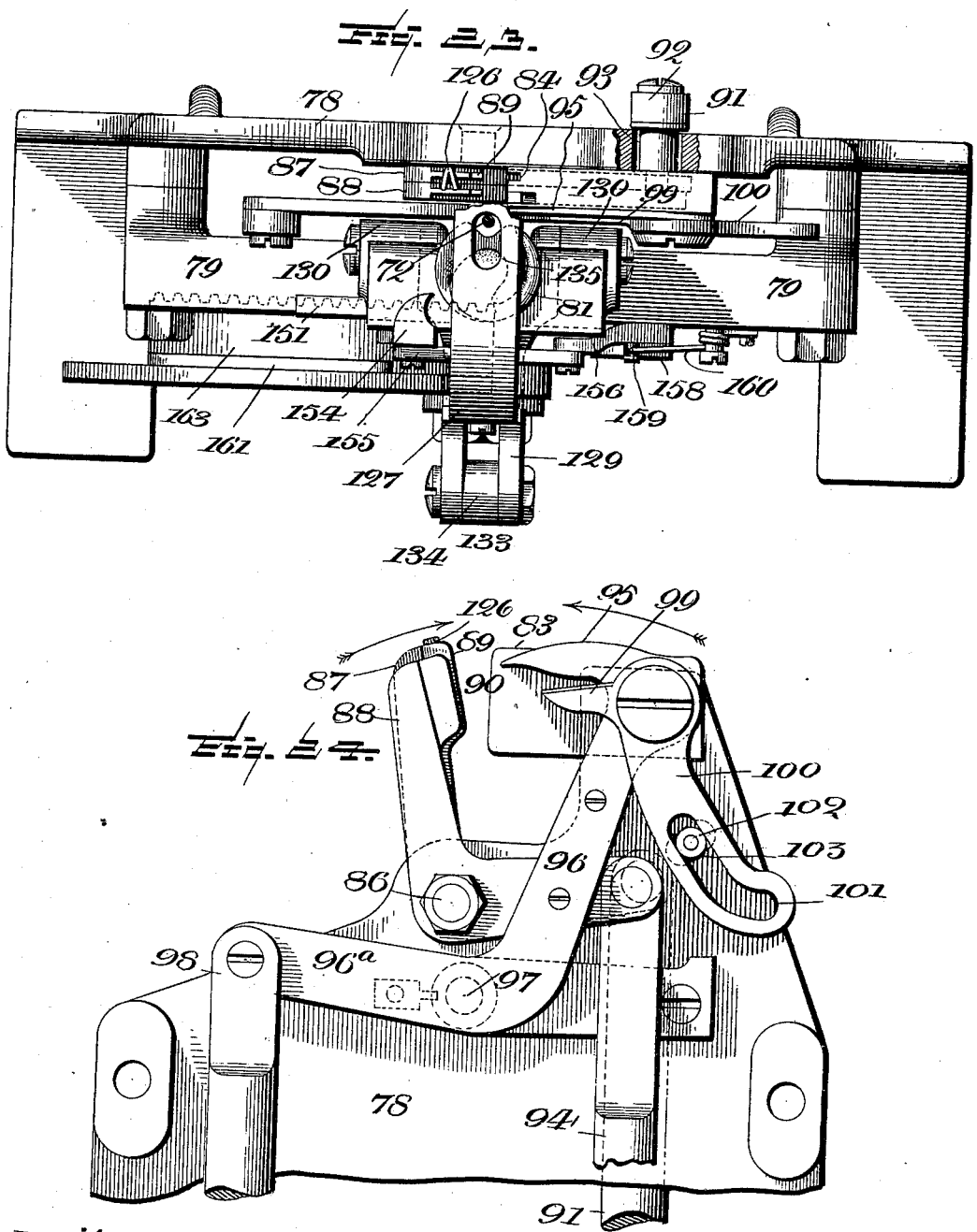

No. 668,339. Patented Feb. 19, 1901.
G. H. PIERCE.
MATTRESS TUFTING MACHINE.
(Application filed Dec. 22, 1899.)
(No Model.) 14 Sheets—Sheet 13.
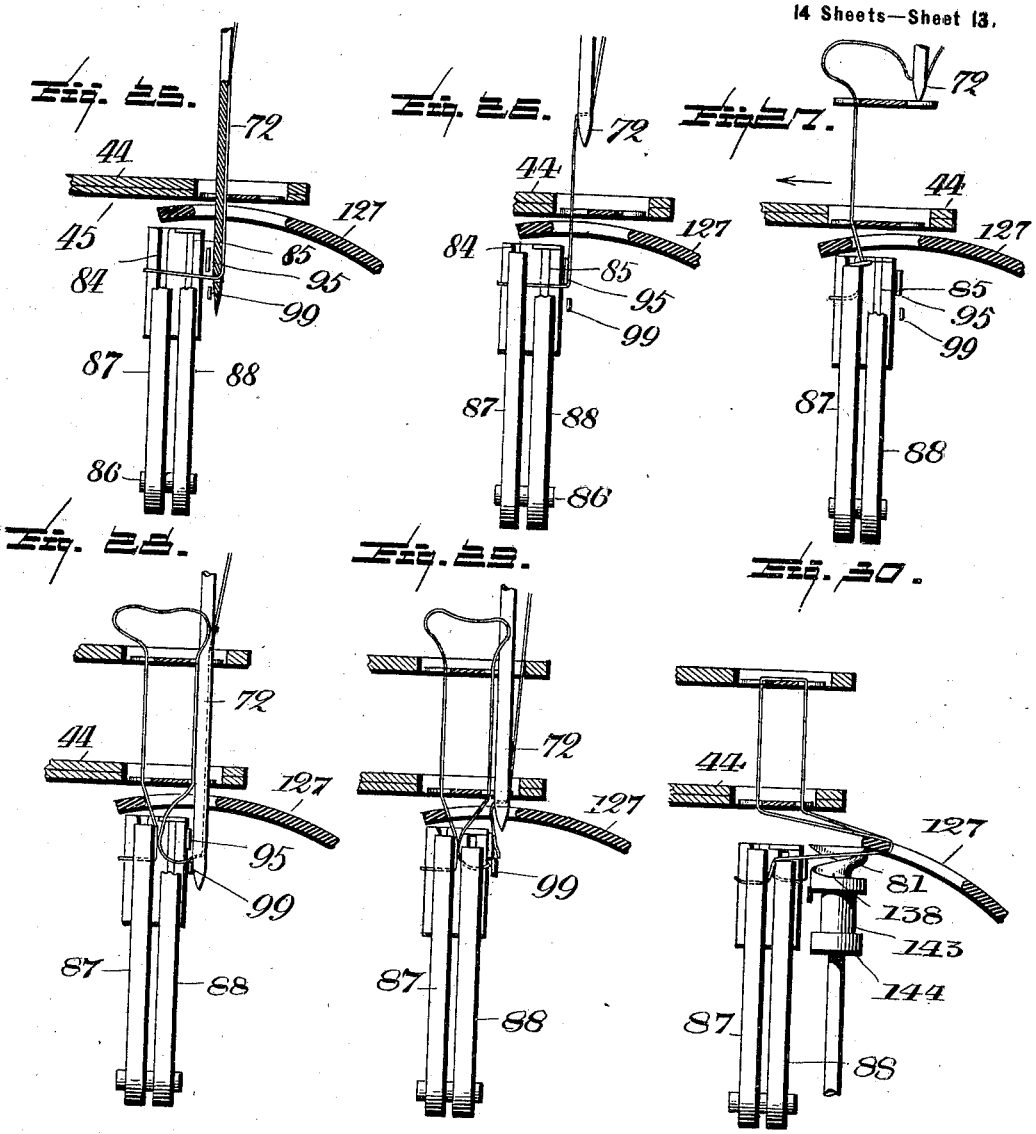
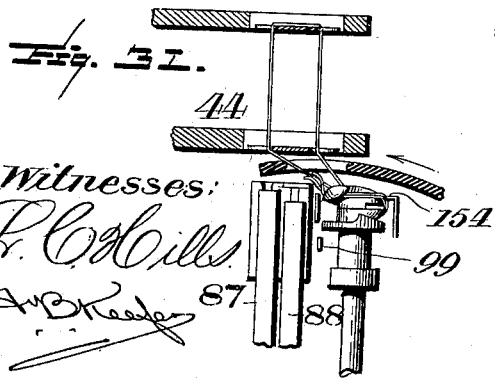
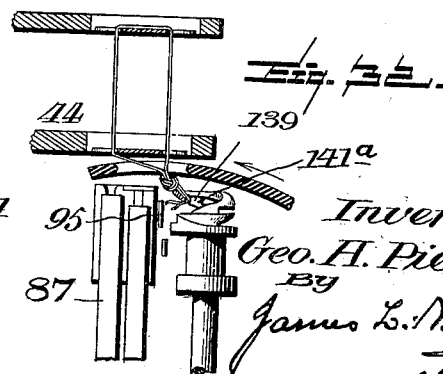
Witnesses:
Inventor
Geo. H. Pierce,
By
James L. Norris
Atty.

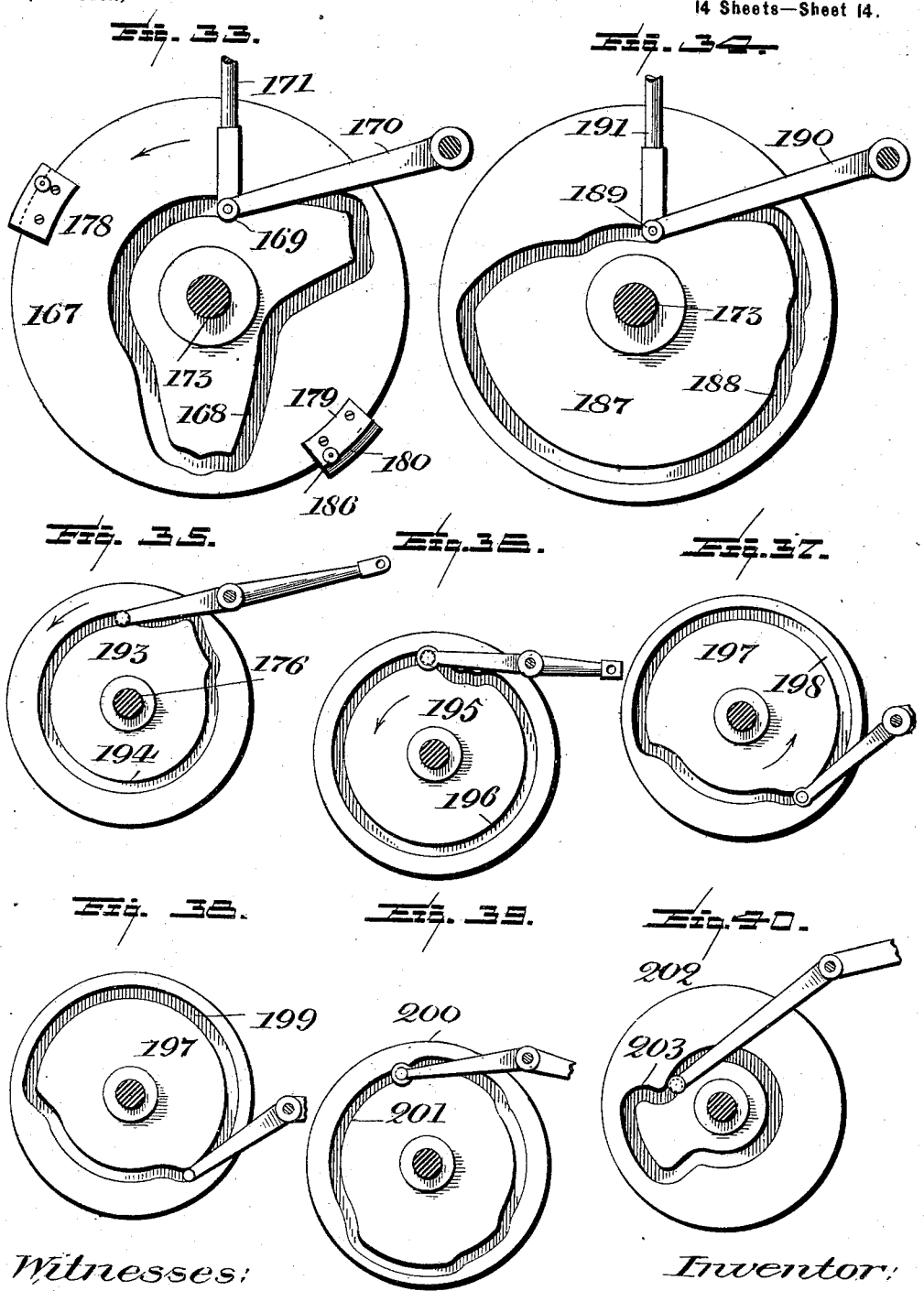

UNITED STATES PATENT OFFICE.

GEORGE HENRY PIERCE, OF DOVER, NEW HAMPSHIRE, ASSIGNOR TO THE AUTOMATIC TUFTING MACHINE COMPANY, OF BOSTON, MASSACHUSETTS.

MATTRESS-TUFTING MACHINE.

SPECIFICATION forming part of Letters Patent No. 668,339, dated February 19, 1901.

Application filed December 22, 1899. Serial No. 741,312. (No model.)

*To all whom it may concern:*

Be it known that I, GEORGE HENRY PIERCE, a citizen of the United States, residing at Dover, in the county of Strafford and State of New Hampshire, have invented new and useful Improvements in Machines for Tufting Mattresses, of which the following is a specification.

My invention relates to machines for tufting mattresses.

Heretofore and prior to my invention automatic machines have been provided for this purpose in which a row of tufts—six or more in number, according to the width of the mattress—has been fed to place upon each side of the mattress and stitched or tied by a single operation of the machine. This simultaneous action upon the entire row of tufts made it necessary that the machine should be provided with as many separate tuft-feeding mechanisms as there were individual tufts in both the upper and lower series of tufts and as many stitching and knotting mechanisms as there were upper and under tufts. Moreover, as the mattress had to be compressed at each of the points where tufts were to be applied means were required to perform this function and to give the two movements to the mattress by which the successive rows of tufts were applied and the needles enabled to make their second stroke, whereby the twine was carried over the tufts and a second strand drawn through the body of the mattress at each point. This duplication of so many different mechanical combinations, some of which were highly complicated, not only multiplied the cost of construction by a large figure, but made it necessary to employ a considerable motive power in its practical operation. Moreover, a very slight and comparatively unimportant derangement of any one of the duplicate mechanisms was liable at any moment to involve one or more and very likely all of the similar mechanisms which operated simultaneously in disaster. Whatever the cause of accident might be it could hardly occur without extending over an entire series of the duplicate mechanisms in which the breakdown happened, and this multiplication of separate points where repairs were required even in the case of slight injuries produced a large item in the running expenses. A serious break involving only part of the series of complicated mechanisms, like the knotters, would cause an appalling increase in such expenses. Besides this the time required for repair, during which the entire machine must remain idle and all work be delayed, constituted another serious objection to a machine of the type referred to.

It is the purpose of my present invention to provide a machine for tufting mattresses which shall not be subject to the objections mentioned and which can be operated either by hand or by a motor of low power.

To this end my invention consists of a single-head machine or, in other words, a tufting-machine which compresses the mattress at a single point, feeds a single tuft to said point upon the upper surface and another to a corresponding point upon the under surface of the mattress, and stitches through the latter at said point to secure said tufts.

It is a further purpose of my invention to simplify and improve the tuft-feeding devices and the means for holding the tufts in place upon the two surfaces of the mattress until such retention is no longer necessary, to reduce the number of parts, and to render their operation more certain.

It is my object also to provide an improved tying mechanism in combination with novel means for effecting a displacement of the mattress between the first and second strokes of the needle, whereby the twine will be carried or straddled over the tuft upon the upper side of the mattress and a second strand of twine drawn through the body of the latter parallel to the first strand to provide ends for knotting beneath the tuft upon the lower side of the mattress.

I aim also to simplify and improve the construction and operation of the knotting mechanism and of the cutter by which the twine is severed after the needle has made its second stroke.

My invention also comprises other novel and useful features, all of which will be fully explained hereinafter and then particularly pointed out and defined in the claims which terminate the following specification.

For the purposes of said description reference is had to the accompanying drawings, in which—

Figure 1 is a side elevation of the complete machine. Figs. 2 and 3 are sectional plan views, the sections being taken upon the lines 2 2 and 3 3, respectively, in Fig. 1. Said figures taken together constitute a single view, upon an enlarged scale, of all the parts lying below the section-lines in Fig. 1. Fig. 4 is a vertical section upon the line 4 4 in Fig. 3, the scale being substantially the same as in Figs. 2 and 3. Fig. 5 is a sectional elevation of the parts comprised in the upper-tuft-feeding mechanism. Fig. 6 is a similar view of the same parts in a different position. Fig. 7 is a plan view, upon an enlarged scale, of the tuft-feed plate removed from the mechanism shown in Figs. 5 and 6. Fig. 8 is a sectional elevation of the lower-tuft-feeding mechanism. Fig. 9 is a bottom plan view of the same. Fig. 10 is a section taken upon the line 10 10 in Fig. 9 looking in the direction indicated by the arrows. Fig. 11 is a detail perspective view of one of the tuft-holding clip-fingers, shown in Fig. 9 in full lines upon one side and in dotted lines upon the other side of the tuft-feed table. Fig. 12 is a perspective view showing the upper presser-foot with a portion of its operating-arm, the upper-tuft-feeding mechanism with its operating rock-shaft, and the needle-bar and needle with the needle-operating lever. Fig. 13 is a perspective view of the upper-tuft tube. Fig. 14 is a perspective view of the lower-tuft tube. Fig. 15 is a perspective view of the carriage by which the mattress is moved between the strokes of the needle in order to cause the twine to cross over the upper tufts. In this view the bed-plate and the lower-tuft tube are removed. Fig. 16 is a perspective view of the knotter-shaft bracket with the shaft, knotter-hook, and cast-off finger. Fig. 17 is a vertical section taken in the axial line of the knotter-shaft in Fig. 16, said shaft being shown in elevation. Fig. 18 is a horizontal section upon the line 18 18 in Fig. 17. Fig. 18ª is a detail perspective of the toothed flat ring removed from the bushing on the spindle of the knotter-hook. Fig. 19 is a front elevation showing the knotting mechanism. Fig. 20 is a side elevation of the same, the point of view being at the left of Fig. 19. Fig. 21 is a perspective view of the jaw end of the gripper-block with the grippers and part of the gripper-arms. Fig. 22 is a vertical section of the gripper-block, the section-line passing through one of the jaws, showing the gripper closed and the spring-gate pushed back. Fig. 23 is a plan view of the knotting mechanism. Fig. 24 is a front elevation of the grippers, the cutter, and their immediate connections. Figs. 25 to 32, inclusive, are diagrammatic views to show the functions of the tying mechanism, Fig. 25 showing the needle at the end of its first stroke, the end of the twine lying in position to be caught by the first gripper. Both gripper-arms are broken off in this figure just below the grippers to show the jaws with which they engage. In these diagrammatic views the complete grippers only appear in those views in which the operation has arrived at a stage where the performance of their function is necessary. Fig. 26 shows the same parts after the accomplishment of the next step, the first gripper having caught the end of the twine and the needle having risen preparatory to a second stroke. Fig. 27 shows the same parts in the same position, save only that the mattress has been shifted over toward the left hand of said figure, as shown by the relative positions of the needle and the tuft, the latter being shown in said figure. Fig. 28 shows the said parts after the needle has descended the second time on the other side of the tuft and then risen slightly to throw out a loop of the twine into the path of the second gripper. Fig. 29 shows said parts after the needle has risen nearly far enough to clear the looper, the second gripper having caught the loop of twine and carried it into the clamping-jaws. Fig. 30 shows said parts after the needle has risen to the limit of its upward movement, the looper-arm having drawn back, taking up the slack of the twine and holding the two-stranded loop in position for the action of the knotter-hook. Fig. 31 shows said parts after the knotter-hook has engaged the two ends of the twine stretched between the grippers and the looper, the cutter having severed the ends close to the second gripper and the cast-off finger being about to act to complete the knot formation. Fig. 32 shows the position of said parts after the knot has been fully formed. Figs. 33 to 40, inclusive, show the several cam-disks and cam-races in the same by which the operative movements of the principal parts are effected. Fig. 33 is the needle-operating cam-disk. Fig. 34 is the pressure-cam by which the presser-foot is operated. Fig. 35 shows the cam by which the looper-arm is actuated. Fig. 36 is the cam operating the knotter. Fig. 37 shows the cam controlling the second gripper. Fig. 38 shows the cam operating the first gripper. Fig. 39 shows the cam operating the cutter by which the twine is severed. Fig. 40 is the cam operating the lower-tuft-feeding device.

The body of the mattress is supported during the operation of tufting by a suitable table or frame of any preferred construction. As this does not constitute an essential feature of my invention, it is not shown in the drawings.

The following description will be clearer if each part is explained as to its construction and function in the order in which the operation proceeds, beginning with the compression of the mattress, the feeding of the tufts to the opposite sides of the mattress, the first descent of the needle, the action of the first gripper, the shift of the mattress, the second descent of the needle, the action of the second gripper, the function of the looper, the severing of the twine by the cutter, and the formation of the knot. As nearly as possible, therefore, the parts will be taken in this order and the construction and operation of each fully explained.

The reference-numerals 1 and 2 in the drawings indicate the horizontal upper and lower members of the machine-frame, which are usually cast in one piece, with a curved connecting portion 3. Upon the end of the upper member 1 are formed or mounted vertical guides 4, in which a presser-bar 5 has movement up and down by means presently described. From the front of the guides 4 rigid bars 6 extend horizontally to form supports for two guide-plates 7, in which a needle-bar 8 has movement. Upon the lower end of the presser-bar 5 is a presser-foot 9, to which is attached a horizontal foot-plate 10. From this plate, between the presser-bar 5 and the needle-bar 8, rises a tuft-tube 12 to contain the tufts, which are successively fed from the lower end of said tube over or through the foot-plate 10 to the upper side of the mattress. The parts referred to are shown in Figs. 1, 12, and 13, and the tuft-feeding devices are shown in detail in Figs. 5, 6, and 7.

The four-lobed tuft commonly used upon mattresses is shown in dotted lines in Fig. 7. These tufts are arranged one upon another in the tuft-tube 12 and are compressed and forced downward therein by a suitable weight 13. The foot-plate 10 is provided with side and end flanges, so as to form a closed guide way or channel 14, in which is arranged a tuft-feed plate 15, capable of movement therein beneath the lower end of the tuft-tube 12. In the upper surface of this feed-plate, at its forward end, is a recess or depression 16, which lies directly beneath the lower end of the tuft-tube when the feed-plate 15 is drawn back, as shown in Fig. 6. The width of said depression and its length are such that the tuft is incapable of any play, but lies therein directly over a central slot 17 in the plate 15, the ends of which extend a little beyond the forward and rearward edges of the tuft. At the forward end of the feed-plate 15 are pivoted two clips 18, each having upon its pivoted end a small cam-shoulder 19, which bears upon the bottom wall of the recess 16 when the clip is turned into horizontal or vertical position, as in Fig. 5 or Fig. 6, and retains it in either position. As the feed-plate 15 moves forward, carrying with it in the recess 16 a tuft from the lower end of the pile of tufts in the tube 12, the backs of the clips 18 are brought against the edges of two plate-springs 20ª, which are made fast with screws to the sides of the foot-plate 10. These plate-springs are covered by a plate having a guide-slot 20 for the needle. This plate serves to keep the twine from catching on the plate-spring 20ª as the needle makes its second stroke. Its sides converge to form a narrow strip 21, which is secured to the channel-piece 12ª, in which the upper-tuft tube 12 is mounted, Figs. 5 and 12. A slot 22 is formed in said plate 20 directly over and in line with the slot 17 in the feed-plate 10. This slot 22 is of the length and width to act as a guide for the needle, which before it reaches the mattress rests against the guide on one side and the tuft on the other, with the result that it goes straight on its downward stroke through the mattress. The clips 18 when turned in the manner described rest upon the two forward lobes of the tuft, as shown in Fig. 7, and prevent all movement during the stitching, the needle passing down first through one end and then through the other end of the slot 17. Figs. 5 and 6 show the parts in position for the needle to pass down between the rearward edge of the tuft and the tuft-tube 12.

The feed-plate 15 is operated by a lever 23, having one end connected by a link 24 to a lug 25 on the feed-plate, its other end having a fulcrum 26 upon the presser-foot 9. Between the ends of said lever is a laterally-projecting stud 27, having an antifriction-roll 28. A bell-crank lever 29, having the end of its short arm fulcrumed at 30 upon the presser-foot 9, has a slightly-elongated opening 31 at the angle formed by the union of its two arms, in which the stud 27 and antifriction-roll 28 have engagement. The long arm of the bell-crank lever 29 extends toward the rear and its end is provided with a laterally-projecting bearing 32 and friction-roll 33, which lie beneath a hanger 34, rigidly attached to the arm 1 and provided with a race 35. As the presser-bar is raised by means described hereinafter, the feed-plate 15 and its actuating-levers being in the position shown in Fig. 5, the roll 33 is brought against a shoulder 36 in front of the open end of the race 35, and as the upward movement continues it enters the race 35 and passes to its closed rearward end, or nearly so, bringing the levers 23 and 29 and the feed-plate 15 into the position shown in Fig. 6, the feed-plate being drawn back far enough to permit a tuft to pass out of the lower end of the tube 12 into the recess 16. As the presser-bar 5 moves downward to compress the mattress the friction-roll 33 is drawn out of the race 35, whereby it acts upon the lever 23 to carry the feed-plate 15 forward to the position shown in Fig. 5 directly over the point where it is to be attached. A similar tuft is also fed to a corresponding point on the under side of the mattress, the means for accomplishing this being shown in Figs. 1, 8, 9, 10, and 11. Upon a bed-plate 37 upon the member 2 of the frame and directly beneath the upper-tuft-feeding mechanism is arranged a rectangular carriage-frame 38, supported upon wheels 39 and capable of a limited forward and rearward movement in unison with the like movements of the parts above as the mattress compressed between is shifted into position for the second stroke of the needle.

Upon the rearward end of the carriage-frame 38, Figs. 1, 3, and 15, is a rising bracket 40, having at its top two parallel horizontal channels 41. The lower-tuft-containing tube 42 is suspended from this bracket, its upper end lying between the channels 41 and within a forwardly-projecting rectangular plate 43. Upon the upper end of the tube 42 is a press-plate 44, between which and the top of the tube is arranged a sliding feed-plate 45, having guidance between side pieces 46, Fig. 9. At its forward end the plate is provided with a recess 47 in its lower face similar to the recess 16 in the feed-plate 15. The tufts, piled one upon another in the tube 42, are fed upward in the latter by a follower 48, mounted on a bar 49, the lower end of which is rigidly secured to a carrier-plate 50, which moves in a longitudinal slot 51 in the tuft-tube 42. The plate 50 is attached to a guide-block 52, Figs. 8 and 15, and movement is given it by a cord 53, passing over a pulley 54 on the bracket 40 and connected to a weight 55. The guide-block 52 slides upon a fixed rod 56. The topmost tuft passes into the recess 47 when the feed-plate is drawn back to the position shown in the bottom plan view in Fig. 9. As the feed-plate is moved forward by means presently described this single tuft T is carried with it, (see Fig. 8,) the one next succeeding being pressed by the follower against the under surface of the feed-plate 45 in the rear of the recess 47. It moves forward until the tuft lies directly under and within the circumference of a circular opening 56 in the press-plate 44, (shown in Figs. 8 and 15,) at which point it is in a direct line beneath the tuft, which is simultaneously fed from the upper-tuft tube 12. As it passes off the pile of tufts in the lower tube 42 the remaining tufts are pressed by the follower 48 against the lower surface of the feed-plate 45, and the tuft fed to the lower side of the mattress is carried beneath a fork 57, which has one end mounted on an inclined bracket 58 on the front of the carriage-frame 38. This fork is narrow and lies over the center of the tuft, and to sustain both sides slide-bars 59 are arranged beneath the side pieces 46 of the press-plate 44 to slide in the guide-channels 41, Figs. 9 and 15. Upon the ends of these bars are elastic strips 60, having on their forward ends curved spring-fingers 61, which extend toward each other at right angles to the elastic strips 60. The slide-bars 59 have slots 62, Figs. 9 and 11, in which lie pins 63, which project downward from the sides of the feed-plate 45. When the latter is drawn back to its limit, as in Fig. 9, the lugs 63 will lie in the rear ends of the slots, and when it moves forward said lugs must traverse the slots 62 their entire length before the slide-bars 59 will move. They will then accompany the feed-plate 45. Upon the side pieces 46 of the presser-plate 44 are two fixed cams 64, one on each side at the points where the rearward movements of the elastic fingers 61 cease. These cams present inclined faces 65 to the ends of the spring-strips 60, which are provided with loops 66. Just before the rearward movement of the fingers 61 ceases these loops ride down on the inclined faces of the cams 64, (see Fig. 10,) thereby drawing the fingers 61 away from the lower face of the press-plate, the separation being sufficient to permit the recessed end of the feed-plate, with a tuft lying in the recess 47, to pass the fingers 61 upon the next feed movement. When this takes place, the feed-plate and tuft pass between the lower face of the press-plate 44 and the spring-fingers 61. When the lugs 63 reach the forward ends of the slots 62, the slide-bars 59 begin to move in unison with the feed-plate, the loops 66 riding up on the inclined cam-faces 65 until the ends of the fingers 61 are brought by the elasticity of the strips 60 against the lower surface of the tuft. The fork 57 passes between the tuft and the recessed end of the feed-plate, a channel 67 being provided in the latter for this purpose, Fig. 9. When the feed-plate draws back, the tuft is left clasped between the fork 57, which lies over it, and the spring-fingers 61, which engage its lower surface, and it lies wholly within a circular opening 68 in the press-plate, so that the needle has unobstructed movement. The spring-fingers 61 are held to their working position by side guides 69, upon the rear ends of which are the cams 64. Stop-pins 70$^a$ are placed on the ends of the press-plate to limit both movements of the feed-plate 45, which is reciprocated by a bell-crank lever 70, fulcrumed upon the bracket 40, Fig. 8, and connected by a link to a forked bracket 71 on the rear of the feed-plate. The means for controlling the operation of the lever 70 will be described at another point. The mattress having been compressed by a limited downward movement of the upper presser-foot 10 and a tuft having been fed to the upper side and another to the lower side of said mattress by the means described, the next operation is the attachment of the tufts. This is effected by a straight needle 72, having an eye near the point like the common sewing-machine needle. It is clamped in the end of the needle-bar 8 and carries twine of a suitable kind, which is drawn off a spool 73, which turns upon a spindle 74, mounted on the upper side of a lever 75, having a fulcrum 76 upon the part 1 of the main frame. This lever is connected to the needle-bar 8 by a pitman 77 and actuates the needle by means presently explained. The operation of the needle is so related to that of the knotting mechanism that a description of the latter will be necessary concurrently with the explanation of the remaining portions of the machine.

The knotter mechanism is all supported upon a knotter-head 78, Figs. 16 to 24, which is placed upon the bed-plate 37, Figs. 1 and 4, inside the carriage-frame 38. Upon the knotter-head is a knotter-shaft bracket 79, Fig. 16, in which is journaled a vertical shaft 80, upon the upper end of which is the knotter-hook 81 and on the lower end a bevel-gear 82. Between the knotter-head and the knotter-shaft bracket is the gripper-jaw block 83, having in one end the jaws 84 and 85 for the first and second grippers, respectively. The grippers, Figs. 21 and 24, are each in the form of a bell-crank lever, and both are pivoted upon a bolt 86, attached to the knotter-head. The first gripper 87 or, that one of the two which is first to act, lies next to the knotter-head 78, and the second gripper 88 is close beside it, their ends having blunt blades 89 and 90, which enter between the parallel jaws 84 and 85, respectively. Although both grippers are upon the same side of the knotter-head 78, they are operated from opposite sides of the latter, the gripper 87 deriving its operative movement from a connecting-rod 91, Figs. 23 and 24, one end of which engages a wrist 92, which projects through a curved slot 93 in the knotter-head. The second gripper 88 is actuated by a similar connecting-rod 94. In both cases the operation is controlled by means described in a subsequent part of this specification.

The jaw-block 83 is mounted upon the upper part of the knotter-head, upon the lateral face adjacent to the needle, Fig. 23, its jaws 84 and 85 standing vertically and nearly in the vertical plane in which the needle descends. Close to the outer face of the jaw-block lies the main cutter-blade 95, which is a rigid part of an angular lever 96, having a fulcrum 97 near its angle and operated by a connecting-bar 98, pivotally attached to the end of the nearly horizontal arm 96ª of the lever 96. When the connecting-rod operates by drawing the end of said arm 96ª downward, the cutter-blade 95 will move forward in the direction in which it points, its end being thereby caused to project beyond the jaw 85, Fig. 24. Upon the heel of the main blade 95, or at the point where it unites with the rising arm of the lever 96, is pivoted the second cutter-blade 99, which has an arm 100, provided with a curved race 101, in which runs a stud 102, rigidly fixed to the knotter-head 78 and having an antifriction-roll 102. As the connecting-rod 98 draws downward upon the lever-arm 96ª the blades 95 and 99 will move together, their point of pivotal connection following a short arc described from the fulcrum 97 as a center. This motion will be modified by the action of the fixed stud 102 in the race 101, and the cutting edges of the two jaws will be caused to close upon each other, the cutting action taking place in the vertical plane of the end of the block 83 in which the jaws 84 and 85 are formed, or as nearly so as possible. The other parts of the knotting mechanism will be explained as they are reached in the order of their action.

Referring now to the diagrammatic views in Fig. 25 et seq., it will be observed that when the needle 72 descends the first time upon the rearward side of the tuft its line of movement is close to the outer face of the cutter-blades 95 and 99. As the needle passes through the mattress the short end of the thread, Fig. 25, is caused to hug the needle. The upper blade 95 of the cutters, Fig. 24, is longer than the lower blade 99, and its edge is rounded from the point as far back as the point of the blade 99, so that it will neither cut nor chafe the twine. The needle passes down far enough to clear this short end of twine from the point of the cutter-blade 95 by about one-fourth of an inch, at which moment the cutters move forward far enough to enable the upper blade to cover the needle with its rounded point. The needle then moves upward until the short end of the twine is thrown, by the round end of the cutter-blade 95, across the jaws 84 of the first gripper 87, as shown in Fig. 25. At this moment the first gripper 87 is operated by the downward movement of the connecting-rod 91, and the end of the twine is caught in the jaws 84. The point of the blade 95 being projected beyond the end of the jaw-block 83, with its rounded edge directly over the caught portion of the twine, as shown in Figs. 25 and 26, the needle in rising has a straight vertical pull upon the twine so nearly in the line of its own movement as to exert no lateral strain. As the needle reaches its limit of upward movement the blade 95 is retracted to its former position and withdrawn from above the twine. The mattress is now shifted a little distance toward the rear in order to bring the tufts on both its surfaces in position for the second stroke of the needle, whereby the twine is crossed over the top of the upper tuft and a second strand of twine carried through the mattress parallel with the first strand. The shift is made by moving the carriage-frame 38 and simultaneously retracting the upper compressing devices and tuft-feeding mechanisms. The shift of the carriage-frame 38 is accomplished by means of a rock-shaft 103, journaled in bearings 104 upon one side of the connecting member 3 of the main frame, Figs. 1 and 2, and having an arm 105, coupled by a rod 106, Figs. 2 and 3, to a lever-arm 107, fulcrumed on a bracket 107ª upon the rear of the bed-plate 37 and connected to the carriage-frame 38. Upon the upper end of the rock-shaft 103 is an arm 108, coupled by a connecting-rod 109 to an arm 110 on a rock-shaft 112, which is supported in bearings 113 on the forward end of the upper member 1 of the main frame, Figs. 1 and 12. Upon the lower end of this rock-shaft is an arm 114, pivotally coupled, through a link connection, to the upper presser-foot 9. This presser-foot is jointed (see Fig. 5) to the lower end of the presser-bar 5, so that it may have a limited sliding movement thereon. At its top the presser-foot 9 has rearwardly-extending horizontal guides 115, which are rabbeted to receive guide-strips 116 on the lower end of the presser-bar 5. The guides 115 are cut away to form notches 117 above the rabbets, and in these notches lie stop-pieces 118, which form part of the presser-bar guideways 5 and serve to limit the movement of the presser-foot. The link connection 119 of the arm 114 can be seen in Fig. 5 underneath the rearward extension of the top of the presser-foot 9. The upper tuft-tube 12 being a rigid attachment to the presser-foot moves with the latter between the horizontal arms 6, Fig. 12, supporting the needle-bar guides 7. The lower presser-plate 44 and tuft-tube 42 move with the carriage-frame 38, being suspended from the bracket 40 upon the rear of said frame. In order to permit the vertical adjustments of the presser-bar 5 and presser-foot 9, the rock-shaft 112 is keyed or splined, Fig. 12, within a long sleeve 120, from which the arm 110 projects and which lies between the bearings 113. The rock-shaft 103, Fig. 1, has at its lower end an arm 121, Fig. 4, by which it is operated at the required intervals, the primary means employed for this purpose being described hereinafter. The mattress, compressed between the upper presser-foot 9 and the lower press-plate 44, with a single strand of twine drawn through it, the projecting lower end of which has been caught by the first gripper 87 and fastened by it in the jaws 84, is now moved or shifted to the rear by the means last described, thereby bringing the upper and lower tufts in the position relatively to the needle shown diagrammatically in Fig. 27. The upper cutter-blade 95 is also drawn back, as already stated, to its normal position of rest, and the needle now makes its second stroke close to forward edges of the tufts, as seen in Fig. 28. After reaching its lowest point it rises slightly to throw out a loop for the second gripper 88. The loop is thrown directly across the jaws 85 in front of the end of the jaw-block 83. To prevent the angles and edges of the jaws 85 from interfering with the formation of this loop, a spring-gate 122, Figs. 21 and 22, is arranged in said jaws and provided with stemmed followers 123, lying in bored channels 124 in the jaw-block and acted upon by springs 125, by which the gate is caused to form flush outer surfaces with the jaw-block whenever the second gripper 88 is withdrawn from its jaws. To prevent the first strand, which has been caught by the first gripper, from becoming entangled with the second and from getting in the line of movement of the second gripper 88 and blocking the jaws 85, by which the latter might be prevented from securely fastening the loop formed by the second strand, a very small V-shaped catch 126 is placed upon the top of the blade 89 of the first gripper 87, Figs. 21, 22, 23, and 24, which rises a little higher than the blade 90 of the second gripper 88. It is arranged horizontally, or nearly so, and its diverging fingers, which open toward the second gripper 88, are sufficiently elastic to pinch the twine when the latter is drawn between them and hold it. The completion of the upward movement of the needle after the first stroke and after the cutter-blade 95 has drawn back is sufficient to effect the engagement referred to, thereby bringing the caught end of the twine and the loop formed by the needle substantially into the relations shown in Fig. 28. The second gripper 88 now operates, catching the loop thrown out by the needle and carrying it into the jaws 85. At the same time the needle rises until a suitable end of twine has been drawn out for the succeeding operation, when the cutter-blades are operated to sever the twine, as shown in Fig. 29.

One element of the knotting mechanism is a looper-arm 127, Figs. 4, 19, 20, and 23, consisting of a curved plate mounted on an arm 128, which is capable of movement in a vertical plane passing through the knotter-shaft 80. The lower end of said arm 128 unites with a cross-arm 129, which extends to bearings 130 upon the vertical members of the knotter-shaft bracket 79, (see Figs. 15, 19, and 20,) the arm dividing into two parts, as shown in section in Fig. 19. The cross-arm 129 also extends outward and is provided with elongated openings 131 in its forked end to receive a bolt 132, connecting the arm to a link 133, which is in turn pivotally connected to the end of an operating-rod 134, controlled by means described hereinafter. The end of the looper 127 is provided with an opening 135 of nearly elliptical shape, Fig. 23, which lies directly beneath the lower tuft during the operation of the needle, as indicated in Figs. 25 to 29, inclusive, the center of the opening 131' being in the vertical plane of movement of the needle, so that both strands of twine pass from the lower side of the mattress through the opening 135 to the grippers 87 and 88. In the operation of the needle a loop of slack twine is left above the upper tuft, as shown in Figs. 27, 28, and 29, and as the needle rises after its second stroke and clears the opening 135 in the looper-arm the latter moves toward the front of the machine, as shown in Fig. 30, pulling the slack loop of twine closely down upon the upper tuft and drawing the two strands that are caught in the grippers directly across the top of the knotter-hook 81.

The knotter-hook is mounted on the upper end of the shaft 80, which has bearings in the center of the knotter-shaft bracket 79, a collar 136 being clamped on the shaft and rested on the lower horizontal member of the bracket to sustain it in place, Fig. 17. Directly below the hook on the knotter-shaft 80 is a disk 137, having a groove or channel 138, which begins at the outer edge of the disk and winds spirally about the shaft with a small upward inclination and a gradual approach toward the axis. The end of the hook is secured to the shaft 80 over the highest point of the spiral channel, and it curves out to one side through about half a circumference, the part next its attached end overhanging the lowest point of the channel 138. The hook curves in a direction opposite to the upward trend of said channel, and near its point it is provided with a vertical shoulder 139. From this shoulder the lower face of the hook is dressed off to form a horizontal face 140, which extends back to the point of attachment to the shaft. The top of the disk is horizontal, and opposite the highest point of the spiral it extends to one side, Fig. 20, forming the overhanging wall of the channel 138, the upper flat face of the same being coincident with the top of the shaft 80. From this overhang is formed a curved arm 141, lying directly beneath the knotter-hook 81. Said arm extends from a point nearly over the foot of the channel 139 to a point about opposite its highest point, its bend being in the same direction as that of the hook 81. At its end is a lug 141$^a$, which rises as high as the undercut face 140 of the hook and lies in the path of the shoulder 139 when the knotter-hook is turned backward. The undercut surface of the hook 81 gives a free space between the latter and the curved arm 141, Fig. 17, for a purpose presently explained.

The disk 137 forms part of a bushing 143, which extends below the bearing for the shaft to receive a fixed collar 144. Between the latter and said bearing is a flat ring 145, loose on the bushing 143 and of smaller diameter than the collar. From this ring, Fig. 18, a tooth or lug 146 projects nearly to the periphery of the collar, on the upper face of which is a stop-lug 147, having a height less than the thickness of the collar. On the lower face of the upper bearing for the shaft, diametrically opposite the stop-lug 147, is a hanging lug or detent 148, which is engaged by the tooth 146 on the collar 144, but passes over the lug 147. A spring 149 is coiled on the shaft 80, and its ends are attached to the collar 136, which is fast on the shaft, and to the collar 146, which is fast on the bushing 143.

In the vertical face of the upper bearing for the shaft 80 is a channel 150, in which is a slide-bar 151, retained in its place by keepers 152. Upon the slide-bar is pivotally mounted a dog 153, Fig. 16, having a cast-off finger 154, which projects from the upper end of the slide-bar at a right angle to the latter. To the lower end of the dog 153, which drops below the slide-bar, is pivoted a link 155, which is connected at its other end to a lever 156, fulcrumed at its lower end upon a stud 157 on the lower member of the knotter-shaft bracket. The lever 156 is vibrated at the required time by a bell-crank lever 158, which is also fulcrumed on the stud 157, Fig. 16. The upright arm of the bell-crank lever lies in front of a stud 159, projecting from the lever 156. A spring 160, Figs. 16 and 19, normally throws the lever 156 in a direction to retract the finger 154. The arm of the bell-crank lever 158 is held against the stud 159 by a light coiled spring 158$^a$. The bell-crank lever 158 therefore gives movement to the slide-bar 151 in the direction indicated by the arrows in Fig. 16, motion in the opposite direction being produced by the spring. The operative movement is effected by a cam-plate 161 upon the inner face of a segmental plate 162, which is carried by a sector-gear 163, Fig. 19, mounted on a bearing 164 in the knotter-head 78, beneath the gear 82, with which the sector-gear meshes. An arm 164$^a$ operates the latter, and to said arm is coupled a connecting-bar 165, operated by means which are described at another point.

Returning now to the description of the operation, which had progressed to the stage represented in Fig. 30, with the looper 127 drawn back, carrying the two strands of twine across the knotter-hook and drawing the slack tightly down on the upper tuft, at this point the sector-gear 163 revolves the shaft 80. The knotter-hook, which passes over the two strands of twine on its first movement, moves forward and passes over said strands the second time until the shoulder 139, Fig. 16, is directly over said strands, when said shoulder is opened by the action of the spring 149, Fig. 17. The two strands immediately adjust themselves in the opening at 139, being firmly held by the grippers 87 and 88. The knotter-hook now moves back until the shoulder 139 is close against the two strands. Here its movement is arrested until both the grippers have released the ends held by them, whereupon it resumes its backward movement until the cast-off finger 154 has drawn the two strands lying across the channel 138 off the knotter-hook 81 and carried them through the double loop of twine, which is cast off the hook by the finger 154. The knot thus formed is drawn up closely enough to insure permanency before the cut ends of the twine are released, and it is drawn tight by the release of the mattress from between the compressing devices, the expansion of the same being sufficient to pull the knotted portion closely against the lower tuft, drawing the knot tight and completing the tufting operation. It will be seen that the knotter-hook derives movement from the shaft 80. The cam-disks by which the several operative movements are controlled are shown separately in Figs. 33 to 40, inclusive. The needle-operating cam-disk 167 is seen in Fig. 33 having a cam-race 168, in which a friction-roll 169 runs. This roll is on the end of a lever-arm 170 and connected by a link-bar 171 to the slotted end 172 of the needle-operating arm 75, Fig. 1. The needle-cam is upon a counter-shaft 173, which is revolved by beveled gears 174 175, the latter being on a power-shaft 176, which lies in bearings 177 on the lower part 2 of the main frame. Upon this cam-disk 167, at almost diametrically opposite points, are the cam-blocks 178 and 179, which actuate the rock-shaft 103. These blocks project from the edge of the disk, as seen in Figs. 1 and 33, and have cam-faces 180, which are inclined at an angle to the plane of rotation of the disk, as shown in Fig. 2. These cam-faces alternately engage a friction-roll 181 upon the end of the arm 121 on the lower end of the shaft 103. After each operation the rock-shaft is locked by a spring-pin 182, Fig. 2, which is thrown into the teeth of a sector-gear 183 on the lower end of the rock-shaft. The locking-pin is released, just prior to the engagement of either cam-block, by a bell-crank lever 184, Figs. 1 and 2, fulcrumed upon a stud 185, below the lock and operated by a projecting pin and friction-roll 186 on each cam-block 178 which engages on around the bell-crank 184. The cam-disk 187, which operates the presser-foot 9 to compress the mattress, is upon the same counter-shaft on the other side of the machine-frame. It has a cam-race 188, in which a roll 189 lies, on the end of a lever-arm 190, which is connected to a bar 191, by which the overhead pressure-lever 192 is operated. The remaining cam-disks are all upon the power-shaft. Fig. 35 shows the disk 193 and cam-race 194, by which the looper-arm is actuated through the connecting-bar 134.

The knotter cam-disk 195 and race 196 are shown in Fig. 36. Figs. 37 and 38 show the disk 197 and races 198 and 199, which control the second gripper 88 and first gripper 87, respectively. These races are in opposite faces of the same disk. The disk 200, with race 201, which operates the cutters 95 and 99, is shown in Fig. 39, and the cam-disk 202, by which the lower-tuft-feed plate 45 is operated, is seen in Fig. 40, with a cam-race 203.

The power-shaft has a worm-gear 204, which receives revolution from a worm 205 on a driving-shaft 206, having a tight and loose pulley 207 and 208. A hand-wheel 209 is placed on the end of the driving-shaft to enable slight adjustments of the mechanism to be made.

What I claim is—

1. In a machine for tufting mattresses, the combination with a single presser-foot capable of both vertical and horizontal movement, of a single press-plate arranged under the presser-foot and capable of horizontal movement only, a vertical tuft-containing tube arranged over the presser-foot in which the tufts are fed downward by gravity, a vertical tuft-tube connected to the lower side of the press-plate, means for feeding the tufts upward in said tube, mechanism for moving the presser-foot vertically to compress the mattress, and means for simultaneously moving both presser-foot and press-plate horizontally after the needle has made a stroke, substantially as described.

2. In a mattress-tufting machine, the combination with an upper presser-foot and a lower press-plate, of tuft-containing tubes one of which is connected to each, tuft-feeding plates arranged to move at a right angle to the exit ends of said tubes, means for feeding the tufts up in the tube connected to the press-plate, a tufting-needle, means for operating said needle, means for locking the ends of the twine, and shifting mechanism to move the mattress between two strokes of the needle, substantially as described.

3. In a mattress-tufting machine, the combination with an upper presser-foot and a lower press-plate, of tuft-containing tubes one of which is connected to each of said parts, tuft-feeding plates one of which is movable between the end of the upper tube and the presser-foot and another between the press-plate and the end of the lower tube, a needle mechanism, grippers to lock the ends of the twine, and means for moving the presser-foot and press-plate together with the mattress compressed between them after the needle has made a stroke, substantially as described.

4. In a mattress-tufting machine, the combination with a vertically and horizontally movable presser-foot, of a press-plate arranged beneath the latter, a horizontally-movable carriage-frame to support the press-plate, a tuft-containing tube arranged over the presser-foot, a tuft-containing tube under the press-plate, means for feeding the tufts upward in the latter tube, feeding devices for removing the tufts singly from each tube, mechanism for moving the presser-foot vertically, and means for simultaneously moving both the presser-foot and the carriage supporting the press-plate horizontally, substantially as described.

5. In a mattress-tufting machine, the combination with a needle mechanism to carry the twine, of a presser-foot and press-plate above and below the mattress, tuft-tubes arranged vertically one over the presser-foot and the other under the press-plate, means for removing the tufts edgewise from the ends of said tubes, a feed device to carry the tufts up in the lower tube, grippers to lock the ends of the twine, and means for moving the presser-foot and press-plate horizontally between successive operations of the needle mechanism, substantially as described.

6. In a mattress-tufting machine, the combination with an upper presser foot and bar, of guides in which the latter is vertically movable, a rabbet-joint between the lower end of the presser bar and foot, means for moving the latter horizontally in said guides, and tuft-feeding mechanism supported on said presser-foot and movable with it, substantially as described.

7. In a mattress-tufting machine the combination with a vertically and horizontally movable upper presser-foot, of a tuft-tube supported thereon, a feed-plate movable between said presser-foot and the lower end of the tube, a lower press-plate a tuft-tube connected thereto, a horizontally-movable carriage-frame to support the press-plate, means for feeding the tufts up in the tuft-tube connected to the press-plate, a needle mechanism to carry the twine, means for locking the ends of said twine, and means for moving the upper presser-foot and the lower press-plate horizontally between two successive strokes of the needle, substantially as described.

8. In a mattress-tufting machine, the combination with an upper and a lower tuft tube, of a presser-foot under the exit end of the upper-tuft tube, a feed-plate movable between said tuft-tube and presser-foot, a lower press-plate to which the lower-tuft tube is connected, a feed-plate movable between the mouth of said tube and the lower face of the press-plate, a needle to carry the twine, means for locking the ends of the twine, and a rock-shaft to move the presser-foot, the press-plate and the tuft-feeding devices connected with them horizontally and simultaneously between two strokes of the needle, substantially as described.

9. In a mattress-tufting machine, the combination with an upper presser-foot and a lower press-plate of tuft-feeding mechanism supported on each, means for moving the upper presser-foot vertically to compress the interposed mattress, a rock-shaft having arms to move said presser-feet and press-plate horizontally at the same moment, a cam-disk having a race to effect the vertical movements of the upper presser-foot, and cam-blocks mounted at opposite points on said disk to operate the rock-shaft, substantially as described.

10. In a mattress-tufting machine, the combination with an upper presser-foot and a lower press-plate, of means for moving the former vertically to compress the mattress, a tuft-feeding mechanism supported on each of said parts, a cam-operated lever to effect the compressing movement of the upper presser-foot, a rock-shaft coupled to the presser-foot and press-plate to shift the same horizontally, a cam-disk having opposite peripheral cam-blocks to operate the rock-shaft, and a lock for the latter to maintain it in position between the operations of said cam-blocks, substantially as described.

11. In a mattress-tufting machine, the combination with an upper and lower tuft feeding mechanism, of a needle carrying the twine, a gripper to catch the end of the twine after the first stroke of the needle, means for shifting the mattress after said stroke, a second gripper to catch a loop in the twine after the second stroke of the needle, a forked catch on the top of the first gripper to hold the strand away from the jaws of the second gripper and a spring-closed gate in the latter jaws, substantially as described.

12. In a mattress-tufting machine, the combination with a vertically and horizontally movable presser-foot, of a vertical tuft-tube supported over the same, a feed-plate having a recessed forward end to receive the tufts from said tube, means for reciprocating said feed-plate between the tube and the presser-foot, spring-clips pivoted on the forward end of the recessed portion of the feed-plate, and a cover-plate over part of the end of the presser-foot, against the edge of which said clips abut as the feed-plate moves, thereby snapping them down upon the tuft, substantially as described.

13. In a mattress-tufting machine, the combination with an upper presser-foot, of a vertical tuft-tube supported thereon, a feed-plate movable between the lower end of said tube and the presser-foot, a lever fulcrumed on the presser-foot and linked to the feed-plate, a bell-crank lever fulcrumed on the presser-foot and connected to a stud between the ends of the first lever, a fixed cam-plate having a horizontal slot, or race, entered by a stud on the end of one arm of the bell-crank lever as the presser-foot rises, and means for moving the latter vertically at suitable times to compress and release the mattress, substantially as described.

14. In a mattress-tufting machine, the combination with a lower press-plate, of a tuft-tube suspended beneath it, means for feeding the tuft up in said tube, a feed-plate to push said tufts singly beneath the forward end of the press-plate, and tuft-retaining devices consisting of slides upon the sides of the press-plate, pins on the feed-plate moving in slots in said slides, spring-strips carried by said slides and provided at their ends with inwardly-extending fingers, and cams upon the sides of the press-plate having inclined surfaces on which the ends of said strips ride as the feed-plate moves, riding up as the plate pushes a tuft to place so that the fingers may engage said tuft, and riding down on the rearward movement to withdraw said fingers from the path of the following tuft, substantially as described.

15. In a mattress-tufting machine, the combination with the lower press-plate, of a feed-plate having a recessed and channeled end and movable between the top of the tuft-tube and the lower face of the press-plate, a fork composed of two horizontal wires mounted on a fixed bracket on the carriage-frame and adapted to pass between the tuft and feed-plate as they are moved, elastic strips having inwardly-extending fingers and mounted on slides movable on the sides of the press-plate, pins on the feed-plate lying in slots in the slides and moving therein to the ends of said slots when a feed movement is made before they impart motion to the slides, side guides on the end of the press-plate to hold the fingers to their work and cams on said guides having inclined cam-faces up which the ends of the strips must ride before the fingers can engage a tuft, a horizontally-movable carriage supporting the press-plate, a tuft-tube supported beneath the latter, means for feeding the tufts up in said tube, and a feed-plate movable between the presser-foot and the open upper end of the tuft-tube, substantially as described.

16. In a mattress-tufting machine, the combination with a needle to carry the twine, of means for locking the ends of said twine, an upper and a lower vertical tuft-tube, means for feeding the tufts up in the lower tube, a horizontally-movable carriage-frame to which said lower tube is attached, a press-plate on a rearward bracket on said carriage-frame, a feed-plate movable between the press-plate and the mouth of the tuft-tube, a presser-foot beneath the end of the upper tuft-tube, a feed-plate movable between the mouth of the tube and the presser-foot, and means for moving said presser-foot, carriage-frame and press-plate and the tuft-feeding devices connected to them horizontally between two successive strokes of the needle, substantially as described.

17. In a mattress-tufting machine, the combination with a needle, of a knotter mechanism comprising two independently-operated grippers, a jaw-block having jaws for said grippers, cutter-blades arranged on the vertical side of the jaw-block and between it and the needle, and means for advancing the cutters to place the upper blade over the end of the twine caught in the first gripper after the first stroke of the needle, substantially as described.

18. In a mattress-tufting machine, the combination with a knotter mechanism comprising two grippers arranged side by side, of a jaw-block having jaws in its end, and a V-shaped catch mounted on top of the first gripper to catch the first strand of twine and hold it away from the jaws of the other gripper, substantially as described.

19. In a mattress-tufting machine, the combination with a needle, of a knotter mechanism comprising two independently-operated grippers, a jaw-block having jaws for each, a V-shaped catch for the first strand of twine to hold it away from the jaws of the other gripper, and a spring-pressed gate thrown out between the jaws of the second gripper, to form flush surfaces and prevent the second strand of twine from becoming entangled by sharp angles, substantially as described.

20. In a mattress-tufting machine, the combination with a needle and means for operating the same, of a knotter mechanism comprising two independent grippers, a jaw-block containing jaws for the same, and a gate to close one jaw when the gripper is removed from it, substantially as described.

21. In a mattress-tufting machine, the combination with a needle, of a knotter mechanism comprising two independent grippers, means for operating the same at different times, a jaw-block containing separate jaws, and a yielding gate to automatically close one of said jaws when the gripper is withdrawn, substantially as described.

22. In a mattress-tufting machine, the combination with a needle and means for operating it, of a knotter mechanism comprising two independent grippers, means for operating the latter successively, a jaw-block with which said grippers engage, cutters mounted close to the flat vertical face of said block, and means for advancing one blade of said cutters beyond the end of the jaw-block after the first downstroke of the needle, substantially as described.

23. In a mattress-tufting machine, the combination with a needle and operative mechanism therefor, of a knotter mechanism comprising two independent grippers, means for operating the same successively, a jaw-block for said grippers, an upper and a lower cutter-blade pivoted together and arranged close to the flat vertical face of the jaw-block, and means for advancing said blades so that one of them shall project its point over the first strand of twine after the latter has been caught by the first gripper, substantially as described.

24. In a mattress-tufting machine, the combination with a needle and with needle-operating mechanism, of a knotter mechanism comprising two independent grippers, a jaw-block having jaws in its end for said grippers, an upper and lower cutter-blade pivoted together and lying close to the vertical face of the jaw-block, and means for advancing the upper blade beyond the end of the jaw-block and over the end of the first strand of twine after the latter has been caught by the first gripper, substantially as described.

25. In a mattress-tufting machine, the combination with a needle and needle-operating mechanism, of a knotter mechanism comprising two independently-operated grippers, a jaw-block for the same having jaws in one end, cutter-blades pivoted together close to the vertical face of the jaw-block, and a cam-disk having a race to operate said cutters whereby the upper blade is pushed out over the first strand of twine, after the latter is caught by the first gripper, and drawn back without cutting action after the needle has risen from its first downstroke, substantially as described.

26. In a mattress-tufting machine, the combination with upper presser-foot and a lower presser-plate and tuft-feeding mechanisms, of a vertical rock-shaft for shifting said press-foot between the strokes of the needle, and an automatic lock for said shaft, substantially as described.

27. In a mattress-tufting machine, the combination with an upper presser-foot and a lower press-plate, of a rock-shaft having arms connected thereto, means for operating said rock-shaft, and a lock for the same comprising a sector-gear and an automatically-released, spring-pressed locking-pin, substantially as described.

28. In a mattress-tufting machine, the combination with an upper presser-foot and a lower press-plate, of a vertical rock-shaft to shift the same horizontally, a lock for said shaft having a spring-engaged locking-pin, and means for automatically releasing the same carried by the device operating said rock-shaft, substantially as described.

29. In a mattress-tufting machine, the combination with an upper presser-foot and a lower press-plate and with means for vertically adjusting one of the same to compress a mattress at a single point, of a rock-shaft for shifting said presser-foot and press-plate horizontally, a cam-disk having two cam-blocks to engage an arm on said rock-shaft and turn it in opposite directions, and an automatic lock for the shaft, consisting of a sector-gear rigid thereon, a spring-engaged locking-pin, a bell-crank lever to retract said locking-pin, a cam-disk having nearly opposite cam-blocks to operate an arm on the rock-shaft, and studs having friction-rolls projecting from said cam-blocks to engage one arm of the bell-crank lever before said cam-blocks engage the arm on the rock-shaft, substantially as described.

In testimony whereof I have hereunto set my hand in presence of two subscribing witnesses.

GEORGE HENRY PIERCE.

Witnesses:
JOHN E. ANDERSON,
JAMES H. BELL.